United States Patent
Davies et al.

[11] 3,895,813
[45] July 22, 1975

[54] SHAFT SEAL

[76] Inventors: John Kyffin Davies, 22 Darlton Dr., Arnold, Nottingham; Bernard Victor Cadman, 1 Woodside Ave., Berryhill Mansfield, Nottingham, both of England

[22] Filed: Dec. 3, 1973

[21] Appl. No.: 421,347

[52] U.S. Cl.................................. 277/88; 277/96
[51] Int. Cl............................................. F16j 15/36
[58] Field of Search................... 277/88, 96, 38–43

[56] References Cited
UNITED STATES PATENTS

| | | | |
|---|---|---|---|
| 3,050,319 | 8/1962 | Colby | 277/96 R |
| 3,068,016 | 12/1962 | Dega | 277/96 R |
| 3,108,816 | 10/1963 | Moore | 277/96 R |
| 3,776,560 | 12/1973 | Wentworth | 277/88 |

*Primary Examiner*—Robert I. Smith
*Attorney, Agent, or Firm*—Carson, Taylor & Hinds

[57] ABSTRACT

The invention relates to sealing means for a rotary shaft which passes through a container wall, such as the casing of a machine, e.g., a pump which operates on water or slurries. A first face seal is provided between lightly contacting sealing surfaces of two rings one of which is secured to the shaft and the other to the wall. These sealing surfaces may be of hard material, e.g. steel, and serve as a barrier to solid material. A second face seal is then provided which acts as a barrier to liquid passing the first face seal and is comprised of co-operating relatively hard and soft sealing surfaces.

7 Claims, 1 Drawing Figure

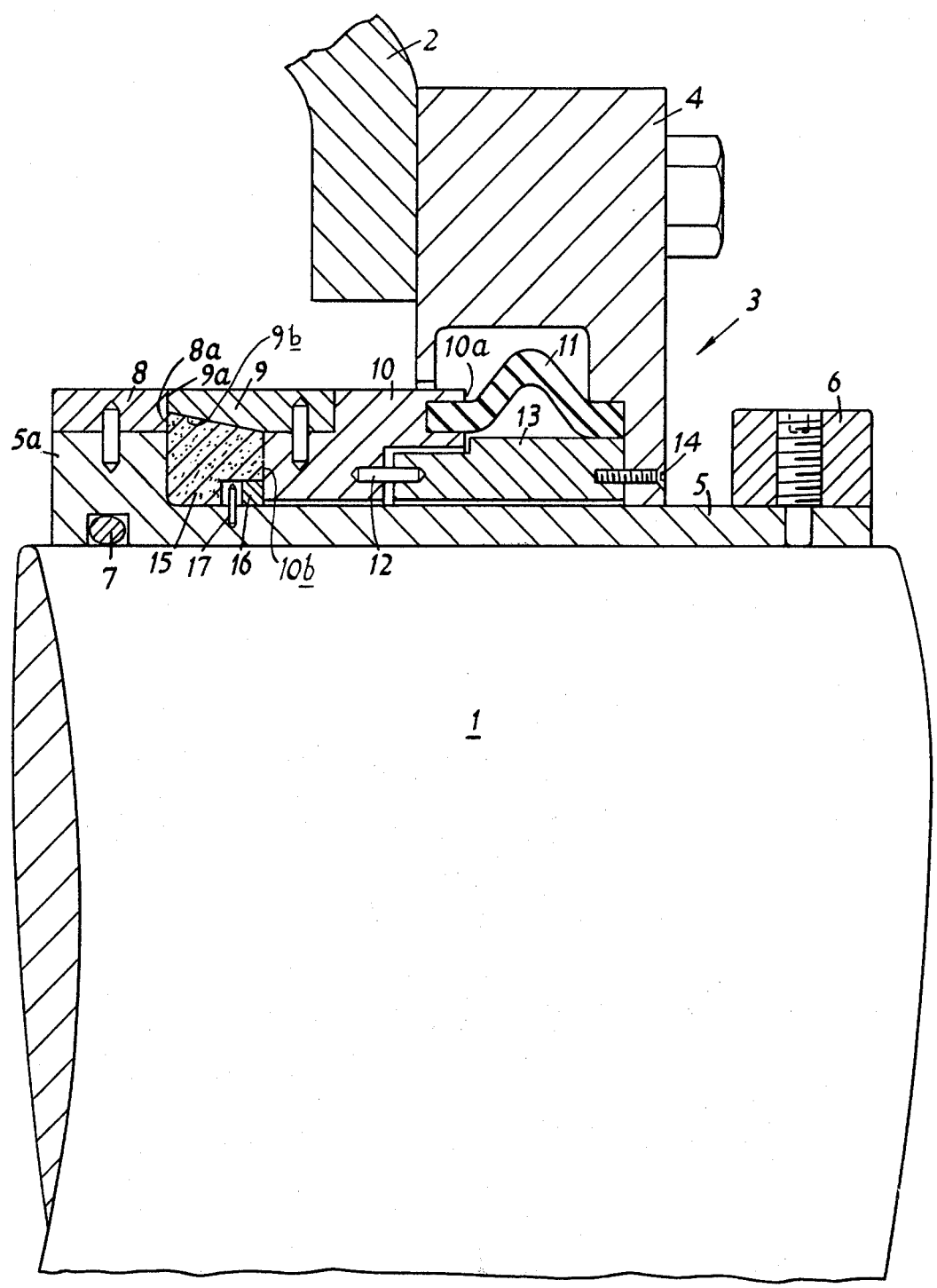

3,895,813

SHAFT SEAL

BACKGROUND TO THE INVENTION

This invention relates to seals for a rotary shaft in a machine having a casing through which the shaft passes and which, when the machine is in use, forms a barrier to a body of liquid on one side thereof.

The invention is particularly applicable to pumps, for example for water or slurry but it is not limited in this respect.

Various types of arrangements for sealing rotary shafts where they pass through a casing are known. In all these prior arrangements one major problem is that of providing an effective seal when the liquid concerned contains particles of solid matter since the latter has tended to work its way between the abutting liquid sealing faces and destroy them in a relatively short time.

BRIEF SUMMARY

An object of the present invention is to provide a seal assembly in which the above problem is obviated.

According to the present invention a seal assembly for use in sealing an aperture in a containing wall through which a rotatable shaft passes, comprises a primary face seal constituted by a first ring member fixedly securable to the shaft in a liquid tight fashion for rotation therewith and a second ring member fixed securable in a liquid tight fashion to the wall about the aperture therein, the ring members being provided on opposed faces with co-operating annular sealing surfaces which are of hard material as hereinafter defined, and which have the same or substantially the same wear characteristics, said surfaces being, in use, in light contact to form a barrier to the passage of solid matter therepast but to permit the passage of an amount of liquid, and at least one secondary face seal operable between the wall and the shaft which comprises a rotatable sealing member securable to the shaft and a non-rotatable sealing member securable to the container wall, one of said sealing members having a sealing surface of hard material and the other a sealing surface of relatively soft material, these surfaces being in relatively firm contact to form a barrier to the passage of said amount of liquid.

The primary seal functions to remove any potentially damaging solid matter from liquid which passes between its sealing faces so that the or each secondary seal comprising relatively hard and soft sealing surfaces operates in an environment which is free of such material.

Seals comprising two hard sealing faces have previously been rejected as unsuitable because the face loading required to ensure an effective seal is so high that the two hard faces are rapidly eroded. Also seals comprising relatively hard and soft surfaces have been considered unsatisfactory in environments where the liquid concerned contains solid matter because the introduction of any solid matter between the sealing faces, which is almost inevitable in time, causes rapid failure of the seal.

In the arrangement provided by the present invention the face loading on the primary seal need only be sufficient to prevent the passage of any potentially damaging solid matter so that the seal faces do not wear excessively; any leakage through this primary seal is dealt with by the secondary seal which has a long life because it operates in an environment which does not contain any potentially damaging solid matter.

DESCRIPTION OF DRAWING.

The accompanying drawing, which is given by way of an example, is a half section taken diametrically of one seal constructed in accordance with the invention.

DETAILED DESCRIPTION OF DRAWING.

The drawing shows a portion of a shaft 1, and a part of a casing 2 of a machine of which the shaft 1 is a part. The machine concerned is a centrifugal pump and the shaft 1 extends leftwards, as shown in the drawing, into a pump chamber in which it is attached to an impeller of the pump, and rightwards to a drive pulley. When the pump is in use the pump chamber contains liquid under pressure and the seal assembly of the invention, which is indicated generally at 3, prevents leakage of the liquid between the shaft 1 and the casing 2.

The seal assembly 3 is mounted on a flange 4 which is bolted to the casing 2. The flange 4 provides a mounting for the non-rotatable components of the seal assembly and the rotatable components thereof are mounted on a sleeve 5 which is clamped to the shaft 1 by means of a collar 6 and is sealed to the shaft by means of an O-ring 7. The seal assembly comprises a primary face seal constituted by a hardened Stellite steel rotary ring 8 which is pegged to a flange 5a formed integral with the sleeve 5 and by a non-rotary ring 9 which is also of hardened steel (Stellite). The ring 9 is pegged to a steel annular carrier component 10. A flexible bellows 11 is sealed into an axially directed groove 10a in the carrier component 10 and the latter is secured against rotation to the flange 4 by pegs 12. The pegs 12 are axially slidable in an annular support member 13 which is fixed to the flange 4 as by screws 14 and secures the bellows 11 into place at the end of the latter remote from the carrier component 10. Thus the carrier component 10 and hence the ring 9 are axially movable with respect to the shaft 1 but are unable to rotate with the latter.

The opposed axially directed surfaces 8a and 9a of the rings 8 and 9 are biassed into abutment so as to form a barrier to the passage of liquid from the exterior of these rings, i.e. from the pump chamber, to the interior of these rings. The biassing force is generated by the bellows 11 which, as can be seen in the drawing, is so formed that the liquid pressure within the pump chamber generates a wedging action in the bellows; this wedging action tends to cause axial extension of the bellows and thereby biasses the assembly of the carrier component 10 and the ring 9 leftwards, as shown in the drawing.

The face loading on the primary seal, i.e. between the faces 8a and 9a is such that any potential damaging solid matter in the liquid in the pump chamber is unable to pass into the interior of the rings 8 and 9, although a certain amount of liquid does leak thereinto, thus providing lubrication for the hardened faces.

Liquid which leaks into the interior of the rings 8 and 9 is dealt with by secondary seals which are provided in the annular cavity which is provided between the ring 9, the sleeve 5 and the flange 5a. In the seal assembly shown two secondary seals are provided, although it will be appreciated that only one such secondary seal is essential to the invention. The first of the secondary seals is constituted by fibre packing 15 which rotates with the sleeve 5 and hence with the shaft 1 and provides a relatively soft sealing surface which abuts an axially directed annular face 10b of the carrier component 10 and also a circumferential inner face 9b of the ring 9. A further secondary seal is constituted on the one hand by a carbon ring 16 which is pegged to the sleeve 5 as at 17 and which bears on the aforementioned axially directed face 10b around an annular surface adjacent the exterior of the sleeve 5. It will be appreciated that the carrier 10 is maintained in contact with the carbon ring 16 by virtue of the axial biassing force generated by the bellows 11. Thus when the machine is in operation any potential damaging solid matter contained in the liquid within the pump chamber is removed from any of said liquid which leaks through between the primary seal faces 8a and 9a, and leakage from the chamber of the cleaned liquid is prevented by the two sets of secondary seals constituted by the packing 15 and the carrier component 10, and the latter and the carbon ring 16 respectively.

It will be appreciated that the seal assembly can be readily removed from the machine for servicing purposes by unbolting the flange 4 and releasing the carrier 10; the entire assembly can then be removed axially of the shaft 1 for replacement of any worn components.

The term "hard," when used in connection with the present invention, encompasses those materials having a hardness equal to or greater than the softer end of the Rockwell C scale, i.e. of about 82 on the Rockwell B scale. Materials thus encompassed include brasses, as well as Stellite as described in the specific embodiment and ceramics; in each case the pair of hard faces will be of the same material, or will be of materials having a similar hardness.

We claim:

1. A seal assembly for use in sealing an aperture in a containing wall through which a rotatable shaft passes, comprising a primary face seal constituted by a first ring member fixedly securable to the shaft in a liquid tight fashion for rotation therewith and a second ring member fixedly securable in a liquid tight fashion to the wall about the aperture therein, the ring members being provided on opposed faces with co-operating annular sealing surfaces which are of hard material having a hardness of at least 82 on the Rockwell B scale, and which have at least substantially the same wear characteristics, said surfaces being, in use, in light contact to form a barrier to the passage of solid matter therepast but to permit the passage of an amount of liquid, and at least one secondary face seal operable between the wall and the shaft which comprises a rotatable sealing member securable to the shaft and a non-rotatable sealing member securable to the container wall, one of said sealing members having a sealing surface of hard material and the other a sealing surface of relatively soft material, these surfaces being in relatively firm contact to form a barrier to the passage of said amount of liquid.

2. A seal assembly as claimed in claim 1, wherein the relatively soft sealing surface of the or each secondary seal is constituted by the surface of an absorbent packing material which is arranged in an annular cavity defined within the annular sealing surfaces of the primary seal rings to abut in a sealing fashion with a portion of one of the primary seal rings within the respective annular sealing surface.

3. A seal assembly as claimed in claim 1, wherein the relatively soft surface of the or each secondary seal is provided on a carbon or carbon composition ring securable to the shaft and abuts an axially directed face provided on a portion of the non-rotatable primary seal ring within the annular sealing surface of the latter.

4. A seal assembly as claimed in claim 3, wherein the carbon ring is fixed to a sleeve which is clampable to the shaft to rotate therewith and wherein at least a part of the rotary primary sealing ring is constituted by an outwardly directed flange of the sleeve.

5. A seal assembly as claimed in claim 3, wherein the non-rotary primary seal ring, in use, is movable axially of the shaft and is biassed to hold the sealing faces of the primary and secondary seals in abutment.

6. A seal assembly as claimed in claim 5, wherein the non-rotary primary seal ring is sealable to the casing by means of an extensible bellows which is so constructed that, in use, the action of liquid pressure thereon tends to produce an extension of the bellows thereby to bias the non-rotary primary seal ring with a force which varies with the liquid pressure against which the seal assembly must be effective.

7. A seal assembly as claimed in claim 1, wherein the non-rotary primary seal ring and the non-rotary one of the secondary seal members are mounted on a flange which is securable to the machine casing.

* * * * *